Oct. 26, 1954   F. K. H. NALLINGER ET AL   2,692,770
AXLE SUSPENSION FOR MOTOR VEHICLES
Filed Oct. 26, 1949
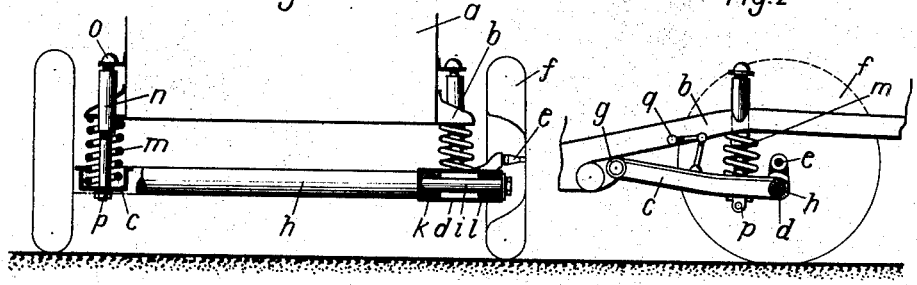
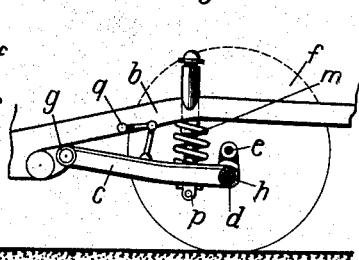
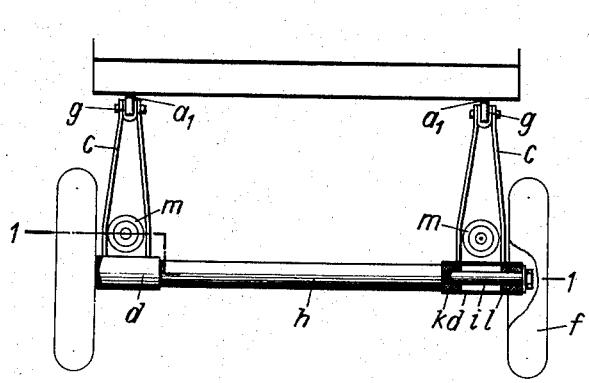
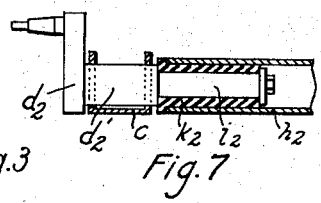
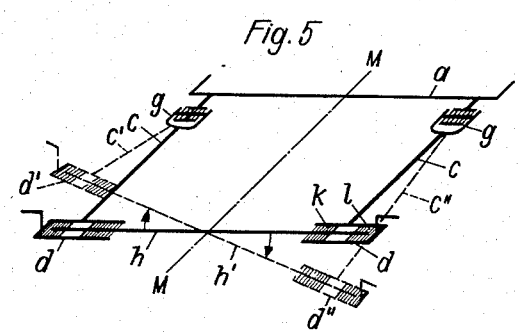
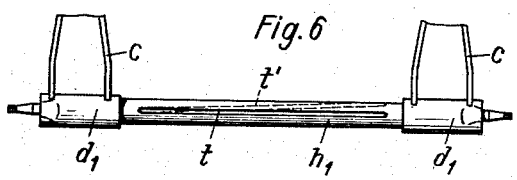
INVENTOR.
FRIEDRICH K. H. NALLINGER
JOSEF MULLER
BY
Haseltine Lake & Co.
AGENTS Patented Oct. 26, 1954

2,692,770

UNITED STATES PATENT OFFICE 2,692,770

AXLE SUSPENSION FOR MOTOR VEHICLES

Friedrich K. H. Nallinger and Josef Müller, Stuttgart, Germany, assignors to Daimler-Benz Aktiengesellschaft, Stuttgart-Unterturkheim, Germany Application October 26, 1949, Serial No. 123,605

Claims priority, application Germany November 2, 1948

20 Claims. (Cl. 267—20)

This invention relates to an axle suspension for vehicles, specially for small passenger cars, and provides for a simple and inexpensive construction, which nevertheless fully copes with all requirements relative to road holding and springing characteristics. An essential feature of the invention accordingly consists in that the wheel supports connected by an intermediary axle member are guided for vertical swinging movement by means of lateral thrust arms and that resilient joints are provided between the thrust arms and the axle member as well as between the thrust arms and the suspended part of the vehicle.

In particular the linking of the thrust arms and axle member is so designed as to permit resilience mainly about an axis running transversely to the direction of drive between the parts to be connected, while forming an only slightly resilient and in addition thereto corner-braced system of thrust-arms and axle member with respect to the horizontal plane. Thus a sufficient stability is provided against lateral forces, without there being the necessity of providing special guide members in addition to the thrust arms for the sprung vertical movement of the axle. It is possible to use non-guiding springs, such as coil springs, or the like with particular advantage.

On the other hand the resilience provided between thrust arms and axle member on the one hand and between thrust-arms and suspended part or frame on the other insures that the axle is permitted to follow every unevenness of the road in the manner necessary for a good springing by cushioning the vertical travel of the wheels both in the same and in the opposite direction. To permit such springing movements of the axle without heavily stressing the thrust arms and joints, it is convenient to provide universal resilience, specially in the linking of thrust arms and frame, allowing a slight slanting of the thrust arms in the joints, a torsion movement about their longitudinal axis and at the same time a slight deflection from the transverse direction. The rubber buffers in the joints of the thrust arms used for this purpose, should advantageously be assembled with initial stress in such a manner that said initial stress is reduced or completely suppressed by the slanting axle. This ensures that the stressing of the rubber and distorsion between the thrust arms and the frame transversely to the direction of drive remains comparatively limited.

Some forms of embodiment of this invention are shown by way of example in the accompanying drawings wherein Fig. 1 is an end elevation of an undriven rear axle, in accordance with the invention, of a motor vehicle viewed as on line 1—1 of Fig. 3.

Fig. 2 is a side view of the axle, one wheel removed.

Fig. 3 is a top plan view of the axle (partly in section).

Fig. 4 is a sectional view of the joint between thrust arms and frame in an enlarged scale.

Fig. 5 is a diagrammatic view explaining the conditions of axle motion.

Fig. 6 is a top plan view of another form of embodiment with torsional elastic axle member.

Figure 7 is an end elevation of a still further form of embodiment.

In Fig. 1 to 3 $a$ designates the suspended part of the vehicle or body with a frame, or frame member $b$. There is a swivel connection about the joint $g$ between the body or frame (hereafter referred to as "frame") and the two thrust arms $c$ rigidly secured (e. g. by welding) to the wheel supports $d$ carrying the journals $i$ with the rear wheels $f$. The two tubular wheel supports are interconnected by an axle member $h$ located below the wheel centers; the trunnion-shaped ends $i$ of said axle member being housed in the wheel supports $d$ by interposition of two rubber rings $k$ and $l$ (or a correspondingly long rubber bushing) in such a manner that there is no metallic contact between axle member and wheel supports. The rubber rings $k$ and $l$, for instance, may be vulcanized to the wheel supports and/or the axle member or adhesively bonded to one of these parts or only inserted in-between, preferably with a pressure fit. The thrust arms consist for instance of one or two sheet metal pressings welded together to a U-section opening upwards and simultaneously serve as lower bearing surface for the coil springs $m$ which abut against the frame member $b$ with their upper ends. Telescopic shock absorbers $n$ mounted within the coil springs are linked at $o$ to the frame and at $p$ to the corresponding thrust arms by means of universal joints. Furthermore a torsion rod $q$ may be provided as stabilizer counteracting oppositely directed relative vertical deflections of the wheels or those of unequal amount.

Fig. 4 shows the joint $g$ linking the thrust arms $c$ to the frame $a$ in an enlarged scale. The thrust arm is forked at its end, the two prongs $c_1$ and $c_2$ bearing the link pin $r$. Between the bore of bracket $a_1$ at the frame and the link pin $r$ a rubber bushing $s$ is inserted having collars $s_1$ and $s_2$ to provide axial support against the central bracket $a_1$ and the prongs $c_1$ and $c_2$. The rubber bushing $s$ is so designed that in addition to a swinging motion between thrust arm and frame $a$ universal resilience between the two parts to be linked is ensured.

Furthermore the design is conveniently so arranged as to pre-load the outer collar $s_1$, of the rubber bushing more than the inner one $s_2$ in the normal axle position (as seen from the central longitudinal plane of the car). For example, this is obtained (assuming a symmetrical conformation of the unstressed rubber) by spacing apart the symmetry axes C of the fork prongs $c_1$, $c_2$ of the two thrust arms $c$ by an amount $2x$ (say $\frac{1}{16}$ in.) less than the distance between the symmetry axes A of the two frame brackets $a_1$, so that each of the thrust arms after assembly, is displaced inwardly by an amount $x$ relatively to its associated bracket (Fig. 4). Thus the collar $s_1$ of the rubber bushing is axially compressed by the additional amount $x$ while the collar $s_2$ is correspondingly relieved.

The behaviour of the axle under the occurring springing movements is as follows:

In the case of the vertical travel of each wheel having the same amount and the same direction, the rubber buffers $k$ and $l$ are not stressed, while the rubber buffers $s$ are only subjected to torsion stress about their axes. The axle system consisting of the thrust arms $c$ and axle member $h$ oscillates without deformation against the action of the springs $m$ about the pins $r$ of links $g$.

In the case of the vertical travel of each wheel having opposite directions (and accordingly in case the amount of travel is different for each wheel although in the same direction) or if the frame is inclined with respect to the axle (e. g. when negotiating a curve), the axle member $h$ is deflected approximately about a central longitudinal axis M—M in Figure 5 with relation to the frame in the direction of the arrow into the position $h'$. Since the ends of the thrust arms $c$ are held in the links $g$, the left thrust arm is deflected downwards relative to the axle member $h$ into position $c'$, while the right thrust arm assumes the position $c''$. The wheel supports $d$ are therefore twisted in opposite directions to the new positions $d'$ and $d''$ respectively and the rubber rings $k$ and $l$ subjected to torsion stress.

Due to the oppositely directed deflection of the two thrust arms $c$, the distance between their frame side ends is increased. This entails an approximation of thrust arm symmetry axes C to the symmetry axes A of the mounting brackets. Thus the amount of displacement $x$ (Fig. 4) is reduced, neutralized or even rendered negative. The collar $s_1$ is relieved, collar $s_2$ more heavily pre-loaded, until eventually the thrust exerted by the arms on the frame from outside to inside is reversed. Simultaneously the thrust arms, due to displacement of the link pins $r$ from aligned positions, take a certain angular position and are twisted, as may be seen in Fig. 5, by an angular amount corresponding to the angular position $h'$ of the axle member about their own longitudinal axis. In spite of these deformations the rubber buffers $s$ prevent excessive torsional stresses. The flexible connection between the thrust arms and the axle member at the same time prevents jamming of these parts under the action of the transverse forces occurring in the links $g$. Since apart from this the substantially rigid thrust arms $c$ and the axle member $h$ form a practically rigid, corner-braced assembly in the horizontal plane, due to the relatively wide spacing of the rubber rings $k$ and $l$ from each other with respect to their radial thickness, all transverse forces acting between frame and wheels and resulting from the surface condition of the road, the action of the masses and from other influences, are reliably absorbed by this system with the required stability.

In the drawing showing the normal position of the wheels with relation to the frame (i. e. as a rule when the car is loaded and at rest), the center of the wheels is approximately at the same vertical level as the joint $g$. Thus the wheels when deflecting deviate only slightly from their normal central position in the longitudinal direction of the vehicle. However, if it is desired to reduce to a minimum the obliquity of the horizontal projection of the wheel axle $h$ upon onesided deflection of the car, it is sufficient to arrange that in the normal position of the wheels the wheel axle be as close as possible at the same level as the joint $g$.

Instead of a separate axle member $h$ linked by the intermediation of rubber buffers respectively to the thrust arms and to the wheel supports, an inherently torsional-elastic axle member $h_1$, as shown in Fig. 6, may be used, the central part of which is given the shape of a tube or the like, slotted in its longitudinal direction and which is rigidly connected at its ends for instance to the thrust arms $c$ and the wheel supports $d_1$. Upon torsional stress of the axle this axle member will helically twist, as shown by the broken line position $t'$ of slot $t$. Furthermore the axle member may consist of several, preferably two halves, for instance, flexibly connected by means of rubber buffers or the like, each half being rigidly connected with one of the wheel carriers or thrust arms.

The example of construction shown, may, of course, be modified in such a manner that the wheel carriers $d$ are mounted within instead of outside the axle member $h$ in rubber buffers or the like. In the embodiment illustrated in Figure 7 the wheels are journalled on wheel carriers $d_2$, the trunnion portions $d_2'$ of which are rigidly connected with the thrust arms $c$, for example by welding. The wheel carriers are further provided with trunnions $i_2$ which extend into the tubular axle member $h_2$ and are journalled therein by means of rubber buffers $k_2$ which for example may be vulcanized to the axle member. Since the axle system itself is exerting readjusting forces against oppositely directed or unequal vertical deflections of the wheels, in particular if the axle member $h$ is of the torsionally flexible type, the action of the stabilizer $q$ can be exclusively performed by the axle itself.

The invention can be applied to driven axles as well as to all kinds of road vehicles.

What is claimed is:

1. An axle suspension for motor vehicles comprising in combination two thrust arms laterally connected with the suspended part of the vehicle and capable of swinging up and down, two wheel carriers carrying the wheels and rigidly connected with said thrust arms in a horizontal plane, an axle member connecting said wheel carriers with each other in such a manner as to permit yielding of the latter with relation to each other about a transverse axis of the vehicle, and elastic means connecting the thrust arms with the suspended part, said thrust arms being connected with the wheel carriers in such a manner as to form a corner-stiff system and resisting forces transverse to the direction of travel, in combination with elastic means providing a torsionally elastic connection of the wheel carriers with the axle member.

2. An axle suspension for vehicles comprising in combination two thrust arms capable of swinging up and down, two wheel carriers carrying the wheels and rigidly connected with the thrust arms in a horizontal plane, an axle member, and elastic means resiliently connecting the wheel carriers with the axle member.

3. An axle suspension according to claim 2 wherein the wheel carriers and axle member are arranged concentrically to each other, said elastic means comprising bush type members of resilient material inserted concentrically between the axle member and the associated wheel carrier.

4. An axle suspension for vehicles comprising in combination two thrust arms laterally connected with the suspended part of the vehicle and capable of swinging up and down, two wheel carriers each carrying a wheel and rigidly connected with the thrust arms in a horizontal plane to form a corner-stiff attachment, an axle member connecting said wheel carriers with each other, elastic means providing a universally elastic connection of the thrust arms with the suspended part and elastic means connecting said wheel carriers with the axle member in such a manner as to give said axle member with relation to the thrust arms a universal resilience, said resilience being prevalent about the axis of the axle member.

5. An axle suspension for vehicles comprising in combination two thrust arms laterally connected with the suspended part of the vehicle and capable of swinging up and down, two wheel carriers each carrying a wheel and rigidly connected with the thrust arms in a horizontal plane, an axle member providing a torsionally elastic connection of the two wheel carriers, said thrust arms being resiliently connected with the suspended part in such a manner that each thrust arm, apart from a resilience about its fulcrum axis to permit an up and down swinging motion guiding the wheel, is capable of yielding simultaneously about at least one axis of rotation running normally thereto in the direction of the thrust arm and in the direction of its fulcrum axis with relation to the suspended part, but resisting forces transverse to the direction of travel acting on the wheels.

6. An axle suspension for vehicles comprising in combination two thrust arms laterally connected with the suspended part of the vehicle and capable of swinging up and down, two wheel carriers each carrying a wheel, and an axle member connecting said wheel carriers, said thrust arms being rigidly connected with the wheel carriers in a horizontal plane to form therewith and with the axle member, in said horizontal plane, a substantially stiff system yieldable, however, about a transverse axis, and buffers of resilient material connecting the thrust arms with the suspended part adapted to permit a yielding motion of the thrust arms in relation to the suspended part of the vehicle, and being subjected to initial stress in the normal position of the vehicle in the direction of the vertical central longitudinal plane of the vehicle by the said stiff system so as to be relieved in case of an oppositely directed vertical travel of the wheels.

7. An axle suspension for vehicles comprising in combination two thrust arms laterally connected with the suspended part of the vehicle and capable of swinging up and down, two wheel carriers each carrying a wheel and rigidly connected with the thrust arms in a horizontal plane, and an axle member connecting the two wheel carriers, said thrust arms having an upwardly open U-section, and vertically arranged coil springs for resiliently supporting the suspended part on the axle, said coil springs being supported at their lower ends in the U-section of the thrust arms.

8. An axle suspension for vehicles comprising in combination two thrust arms laterally articulated to the suspended part of the vehicle with elastic means for providing a universally elastic articulation of the thrust arms to the vehicle body, a cylindrical wheel carrier rigidly connected with each thrust arm, an axle member connecting the two wheel carriers with trunnion-shaped ends surrounded by said cylindrical wheel carriers, and rubber bushings between said cylindrical wheel carriers and the trunnion-shaped ends of the axle member for providing a torsionally elastic connection between said parts.

9. An axle suspension according to claim 8 in which the rubber bushings are adhesively connected with the trunnion-shaped ends of the axle member and the cylindrical wheel carriers.

10. An axle suspension according to claim 5 in which the axle member is substantially rigidly connected with the wheel carriers, and has a torsionally elastic design.

11. An axle suspension according to claim 5 in which the axle member is substantially rigidly connected with the wheel carriers, and is designed as a tube slotted in its longitudinal direction.

12. An axle suspension for motor vehicles comprising in combination two thrust arms laterally connected with the suspended part of the vehicle and capable of swinging up and down, two wheel carriers carrying the wheels and rigidly connected with said thrust arms in a horizontal plane, an axle member, resilient means connecting said axle member with said wheel carriers to form therewith a substantially rigid system in a horizontal plane and yielding thereof about a transverse axis of the vehicle, and yieldable means connecting the thrust arms to the suspended part and having pin line members constructed and arranged to permit swinging movement of said thrust arms about a transverse axis relatively to the suspended part and slight yielding movement simultaneously also in other directions.

13. An axle suspension for motor vehicles comprising in combination: two thrust arms laterally connected with the suspended part of the vehicle and capable of swinging vertically, two wheel carriers carrying the wheels and rigidly connected with said thrust arms in a horizontal plane, an axle member positioned below the wheel centers and having two ends each connected to one of said wheel carriers, said axle members having means adapted to permit torsional yield of said wheel carriers relatively to each other about the axis of said axle member and elastic means connecting the thrust arms with the suspended part of the vehicle.

14. An axle suspension for motor vehicles comprising a chassis, a pair of road wheels disposed oppositely to each other, a link member for each of said two road wheels, means pivotally connecting one end of each link member to said chassis for movement about an axis extending transversely to the driving direction, a wheel support for each of said link members, and an axle member connecting said two wheel supports, said link member, wheel supports and axle member being so connected to each other as to form an essentially diagonal-rigid system resisting forces transverse to the direction of travel and having means between the two wheel supports adapted to permit movement of said wheel supports, together with said link members relative to each other around a transverse axis of the vehicle, said axle member being permitted to swing about a central longitudinal axis extending in the driving direction relative to said chassis, means adapted to secure said wheel supports relative to said axle member against movement in an axial direction and further means being provided to allow a yielding movement of said link members with respect to said chassis in a transverse direction of the vehicle.

15. An axle suspension according to claim 5, wherein said axle member is a torsional resilient member and rigidly connected to said wheel carriers, in combination with substantially vertically arranged coil spring means resiliently supporting the suspended part on the axle, said coil spring means being supported at their lower ends on the thrust arms.

16. An axle suspension according to claim 6 in combination with link joints between said thrust arms and said suspended part and comprising a central joint member on one of the two parts to be connected with an opening therein, fork arms on the other of the two parts to be connected embracing said central joint member at both sides with axial play, a pin mounted in said fork arms and projecting with radial play through said opening in said central joint member, said buffers of resilient material bridging over said axial play between the central joint member and the fork arms and said radial play between said central members and the pin.

17. An axle suspension according to claim 5, wherein the thrust arms are made of sheet metal pressings which are shaped as a fork at their ends with rubber buffers connecting the fork with the suspended part of the vehicle and which has a U-shaped cross section open from above, in combination with coil springs supported at one end on the thrust arms from above and at the other end on the suspended part from below.

18. An axle suspension according to claim 5, wherein the axle member is positioned below the wheel centers, in combination with spring means resiliently supporting the suspended part on the wheel carriers, said spring means being so dimensioned that in the normal position of the vehicle the axle member connecting the wheel carriers is approximately at the same level above the road as the articulation of the thrust arms to the suspended parts.

19. An axle suspension according to claim 5, wherein the axle member is positioned below the wheel centers, in combination with spring means resiliently supporting the suspended part on the wheel carriers, said spring means being so dimensioned that in the normal position of the vehicle the wheel centers are approximately at the same level above the road as the articulation of the thrust arms to the suspended part.

20. An axle suspension for vehicles comprising, in combination: two thrust arms laterally connected with the suspended part of the vehicle and capable of vertical swinging movement; two wheel carriers each carrying a wheel; an axle member connecting said wheel carriers; said thrust arms being rigidly connected with the wheel carriers in a horizontal plane to form therewith and with the axle member, in the transverse direction of the vehicle, a substantially stiff system yieldable, however, about a transverse axis; and a joint connecting each of the two thrust arms to the suspended part comprising a central joint member fixed to one of the two parts to be connected, fork arms on the other part to be connected embracing said joint member from both sides with axial play in a transverse direction of the vehicle and comprising an arm adjacent the vertical central longitudinal plane of the joint and an arm opposite said plane, a pin mounted in said fork arms and extending with radial play through an opening in said central joint member, and elastic means including a first part bridging the axial play between the central joint member and the fork arm adjacent the vertical central longitudinal plane of the vehicle, a second part bridging the axial play between the central joint member and the fork arm opposite the vertical central longitudinal plane of the vehicle, said second part being initially more stressed than said first part, and a third part bridging the radial play between the central joint member and the pin.

References Cited in the file of this patent

UNITED STATES PATENTS

| Number | Name | Date |
| --- | --- | --- |
| 1,913,513 | Rossman et al. | June 13, 1933 |
| 1,987,269 | Roos | Jan. 8, 1935 |
| 2,050,099 | Kennedy | Aug. 4, 1936 |
| 2,077,710 | Pribil | Apr. 20, 1937 |
| 2,219,828 | Steinmann | Oct. 29, 1940 |
| 2,222,377 | Slack | Nov. 19, 1940 |
| 2,298,585 | Phelps | Oct. 13, 1942 |
| 2,305,795 | Schieferstein | Dec. 22, 1942 |
| 2,352,446 | Pointer | June 27, 1944 |
| 2,396,579 | Krotz | Mar. 12, 1946 |
| 2,582,775 | Giacosa | Jan. 15, 1952 |

FOREIGN PATENTS

| Number | Country | Date |
| --- | --- | --- |
| 311,097 | Great Britain | May 9, 1929 |
| 709,876 | Germany | Aug. 29, 1941 |